(12) United States Patent
Schedel et al.

(10) Patent No.: US 10,183,580 B2
(45) Date of Patent: Jan. 22, 2019

(54) METHOD AND CONTROL DEVICE FOR CONTROLLING THE WASTE HEAT GENERATED BY AN ELECTRIC VEHICLE

(71) Applicant: Bayerische Motoren Werke Aktiengesellschaft, Munich (DE)

(72) Inventors: Felix Schedel, Gauting (DE); Michael Griesbeck, Munich (DE); Hajo Meinert, Munich (DE); Jens Richter, Neubiberg (DE); Philipp Hofmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 130 days.

(21) Appl. No.: 15/333,387

(22) Filed: Oct. 25, 2016

(65) Prior Publication Data

US 2017/0036546 A1 Feb. 9, 2017

Related U.S. Application Data

(63) Continuation of application No. PCT/EP2015/063078, filed on Jun. 11, 2015.

(30) Foreign Application Priority Data

Jun. 16, 2014 (DE) .................. 10 2014 211 447

(51) Int. Cl.
*B60L 3/00* (2006.01)
*B60L 15/20* (2006.01)
(Continued)

(52) U.S. Cl.
CPC ............ *B60L 3/0061* (2013.01); *B60L 15/20* (2013.01); *H02P 29/60* (2016.02); *H02P 29/68* (2016.02);
(Continued)

(58) Field of Classification Search
CPC .. B60L 3/0061; B60L 15/20; B60L 2240/425; B60L 2240/526; H02P 29/60;
(Continued)

(56) References Cited

U.S. PATENT DOCUMENTS 5,950,752 A 9/1999 Lyons
7,218,071 B1 5/2007 Welchko et al.
(Continued)

FOREIGN PATENT DOCUMENTS

CN 101223685 A 7/2008
DE 698 16 235 T2 4/2004
(Continued)

OTHER PUBLICATIONS

English translation of WO2014053316 from Espacenet, Accessed Apr. 2018 (Year: 2018).*
(Continued)

*Primary Examiner* — Krishnan Ramesh
(74) *Attorney, Agent, or Firm* — Crowell & Moring LLP

(57) ABSTRACT

A method and a system are provided for controlling waste heat generated by a motor vehicle having an electric drive including a rechargeable battery and an electric machine for driving the motor vehicle. The method includes determining the thermal load on at least two components of the electric drive; if a first electric component of the electric drive has a lower thermal load than a second electric component, actuating the electric drive such that the generation of waste heat in the first electric component increases and the generation of waste heat in the second electric component does not increase; and if the second electric component has a lower thermal load than the first electric component, actuating the electric drive such that the generation of waste heat
(Continued)

in the second electric component increases and the generation of waste heat in the first electric component does not increase.

7 Claims, 1 Drawing Sheet

(51) Int. Cl.
*H02P 29/60* (2016.01)
*H02P 29/68* (2016.01)
*B60K 1/00* (2006.01)

(52) U.S. Cl.
CPC ... *B60K 2001/006* (2013.01); *B60L 2240/425* (2013.01); *B60L 2240/525* (2013.01); *B60L 2240/526* (2013.01); *Y02T 10/645* (2013.01); *Y02T 10/72* (2013.01); *Y02T 10/7275* (2013.01)

(58) Field of Classification Search
CPC . H02P 29/68; B60K 2001/006; Y02T 10/645; Y02T 10/72; Y02T 10/7275
USPC .......................................................... 701/22
See application file for complete search history.

(56) References Cited

U.S. PATENT DOCUMENTS

| | | | |
|---|---|---|---|
| 2003/0196631 A1 | 10/2003 | Dehrmann et al. | |
| 2006/0279263 A1* | 12/2006 | Fassnacht | B60H 1/00428 323/222 |
| 2008/0143281 A1 | 6/2008 | Yaguchi | |
| 2012/0090905 A1 | 4/2012 | Vollmer et al. | |
| 2013/0175022 A1* | 7/2013 | King | B60H 1/00392 165/202 |
| 2014/0326430 A1* | 11/2014 | Carpenter | B60L 11/1874 165/41 |
| 2015/0105958 A1* | 4/2015 | Schnurr | B60W 20/10 701/22 |
| 2015/0128632 A1* | 5/2015 | Kishita | B60L 11/1875 62/324.6 |
| 2015/0246591 A1* | 9/2015 | Ono | B60H 1/004 701/22 |

FOREIGN PATENT DOCUMENTS

| | | |
|---|---|---|
| DE | 10 2007 011 696 A1 | 10/2007 |
| DE | 10 2009 000 204 A1 | 7/2010 |
| DE | 10 2009 016 764 A1 | 10/2010 |
| DE | 10 2012 019 005 A1 | 4/2013 |
| EP | 1 313 628 B1 | 10/2012 |
| JP | 2-155827 A | 6/1990 |
| WO | WO 2014-053316 A2 | 4/2014 |

OTHER PUBLICATIONS

German-language Search Report issued in counterpart German Application No. 10 2014 211 447.0 dated Aug. 26, 2014 with partial English translation (11 pages).

International Search Report (PCT/ISA/210) issued in PCT Application No. PCT/EP2015/063078 dated Sep. 15, 2015 with English translation (5 pages).

German-language Written Opinion (PCT/ISA/237) issued in PCT Application No. PCT/EP2015/063078 dated Sep. 15, 2015 (7 pages).

Chinese-language Office Action issued in counterpart Chinese Application No. 201580014973.3 dated Jul. 10, 2017 with English translation (8 pages).

\* cited by examiner

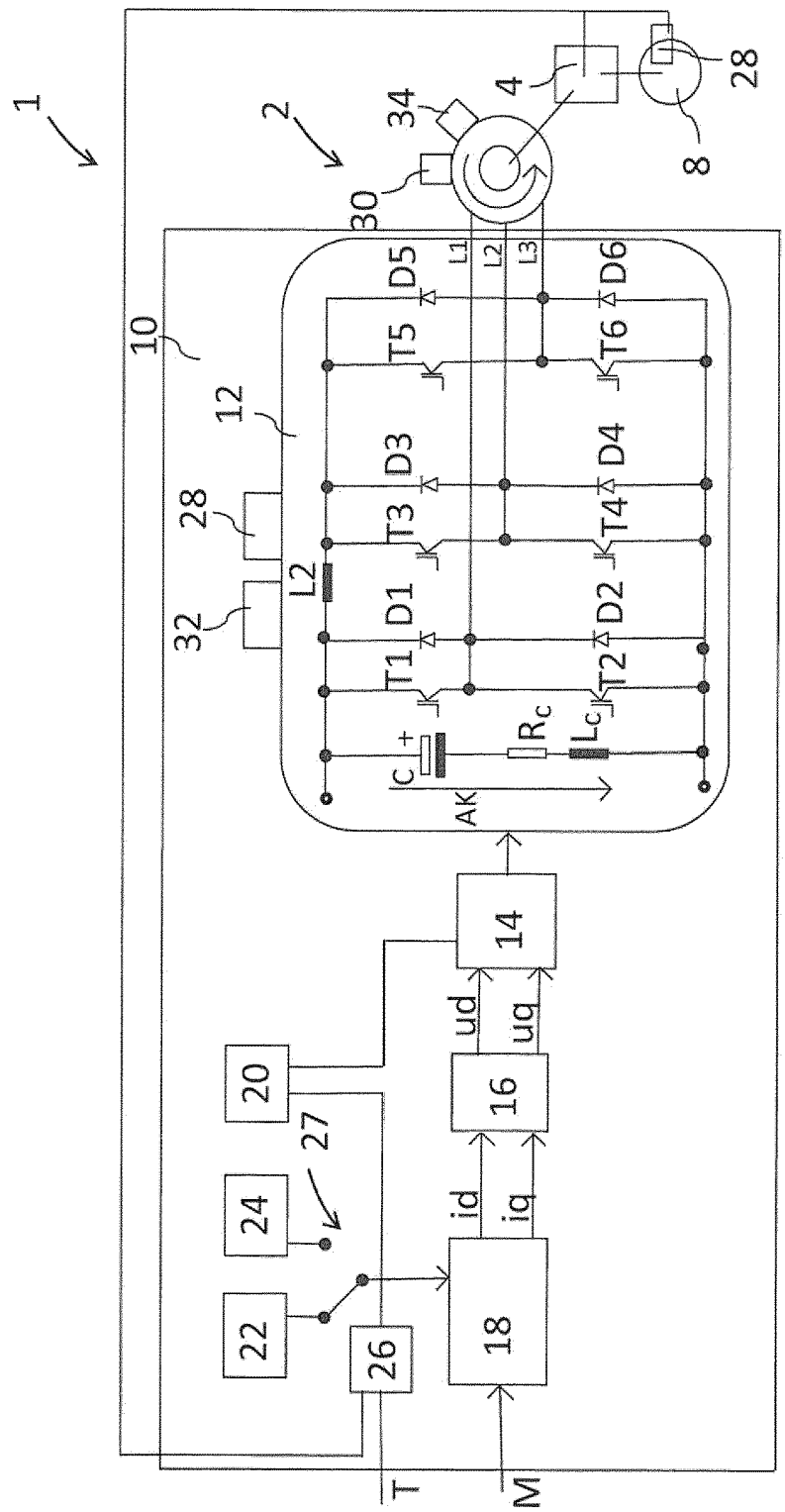

METHOD AND CONTROL DEVICE FOR CONTROLLING THE WASTE HEAT GENERATED BY AN ELECTRIC VEHICLE

CROSS REFERENCE TO RELATED APPLICATIONS

This application is a continuation of PCT International Application No. PCT/EP2015/063078, filed Jun. 11, 2015, which claims priority under 35 U.S.C. § 119 from German Patent Application No. 10 2014 211 447.0, filed Jun. 16, 2014, the entire disclosures of which are herein expressly incorporated by reference.

BACKGROUND AND SUMMARY OF THE INVENTION

The present invention relates to a method and a control device for controlling the waste heat generated by a motor vehicle with an electric drive, wherein the electric drive has at least one rechargeable battery and an electric machine for driving the motor vehicle.

Motor vehicles that are operated exclusively electrically over long periods of travel include electric heating devices for heating the interior because the heat loss of the electric drive train, for example the rechargeable battery (high voltage battery), the electric machine, the power electronics, the direct current/direct current converter and the like is not sufficient in all driving situations to heat the interior of the motor vehicle. Such an additional electric heating device requires additional installation space, increases the cost of the motor vehicle, and increases the weight of the motor vehicle.

It is known from DE 10 2012 019 005 A1 to use the waste heat of the electric machine and the electric actuator for heating the interior of a motor vehicle.

EP 1 313 628 B1 discloses the operation of an electric machine of a motor vehicle outside of the optimum operating point to increase the heat loss and control the temperature of the interior.

The service life of an electric component depends, among other things, on the temperature of the component during operation. Temperature fluctuations of the components of an electric drive can also reduce the service life of the components.

The object of the invention is to provide an improved method and an improved control means to control the waste heat generated by a motor vehicle with an electric drive.

The object of the invention is attained with a method for controlling the waste heat, a computer program, a waste heat control system and a motor vehicle having such a waste heat control system, in accordance with embodiments of the invention.

The method according to the invention for controlling the waste heat generated by a motor vehicle with an electric drive, wherein the electric drive comprises a rechargeable battery and an electric machine for driving the motor vehicle, includes the act of determining the thermal load of at least two components of the electric drive. If a first electric component of the electric drive has a lower thermal load than a second electric component, the electric drive is actuated in such a way that the generation of waste heat in the first electric component of the electric drive increases and the generation of waste heat in the second electric component of the electric drive does not increase, and preferably decreases. If the second electric component of the electric drive has a lower thermal load than the first electric component, the electric drive is actuated in such a way that the generation of waste heat in the second electric component of the electric drive increases and the generation of waste heat in the first electric component of the electric drive does not increase, and preferably decreases.

The term "thermal load" may include a temperature of the electric component, the integral of the temperature of the electric component over time, a difference to the maximum allowable temperature, a combination of said quantities, any other thermal quantity and/or any combinations of thermal quantities. The electric drive comprises the rechargeable battery, the electric machine that is supplied with current by the rechargeable battery and drives the motor vehicle, and a drive control device that controls the actuation of the electric machine with current from the rechargeable battery and/or controls the charging of the rechargeable battery with current generated by the electric machine. The drive control means can comprise a direct current/direct current converter with a plurality of power transistors, a link capacitor, plugs, lines, a semiconductor-actuation, capacitors, diodes, and other passive components.

The method can also include the step of requesting heat for controlling the temperature of the interior. Subsequent thereto, the thermal load of at least two components of the electric drive is determined. Furthermore, the method can include the step of controlling the temperature of the interior of the motor vehicle with the waste heat generated by the components of the electric drive.

The method also includes the step of increasing the switching frequency of at least one of the transistors of the control device if more waste heat is to be generated in the drive control device and less waste heat is to be generated in the electric machine. Furthermore, the method may include the step of reducing the switching frequency of at least one of the transistors in the drive control device if less waste heat is to be generated in the drive control device and more waste heat is to be generated in the electric machine. The switching frequency is the frequency that generates the sampling points of the current signal, which form the current signal that is delivered to the electric machine.

Usually, the switching frequency of the transistors can be set between 5 kHz and 10 kHz. Generally, a lower switching frequency is used at lower speeds, and a higher switching frequency is used at higher speeds.

The method can also include the step of monitoring the temperature of the drive control device and the actuation of the electric drive in such a way that the fluctuation of the temperature of the components of the drive control device is lower than a predetermined threshold value. This ensures that temperature fluctuations of the components of the drive control device are avoided, which can increase the service life of the components of the drive control device and the drive control device as such overall.

The method can also include the step of supplying current by the drive control device in such a way that the ratio of the field-generating current id and the torque-generating current iq is outside of the optimum ratio of the field-generating current id and the torque-generating current iq for the respective operating point. In particular, increasing the field-generating current id leads to more dissipation power in the electric components of the drive control device. By impressing current that does not have the optimum ratio of the field-generating current id and the torque-generating current iq, the temperature in the electric machine as well as the temperature of the components of the drive control device is increased.

According to another aspect of the invention, it is possible to combine two measures. If more dissipation power is to be generated overall to control the temperature of the interior of the motor vehicle, a first method step can be performed, in which less waste heat is generated in one component of the electric drive, for example by changing the switching frequency. Then a second method step can be performed, which generates more waste heat in at least two components of the electric drive. In this way, it is possible to control the generation of waste heat in such a way that in the component in which less waste heat is generated because of the first method step, essentially the same waste heat is generated again as prior to the first method step to reduce the waste heat generated by the first component. This makes it possible to increase the service life of the components because they are operated at a constant temperature as much as possible.

The method can furthermore include the steps of applying a brake of the motor vehicle and the actuation of the electric drive in such a way that it is to move the motor vehicle. The emergency brake supports the torque generated by the electric machine. The torque tensions the power train. This results in only slight noise because there is no rotation and a constant torque is applied. Because of the limited holding torque of the emergency brake, for example of approximately 50 Nm to approximately 100 Nm, the maximum torque of the electric machine is limited. Because of the direct current load during standstill, the limiting continuous withstand power of the electric machine and the drive control device decreases. When the brake is released inadvertently or if the holding force is exceeded, for example with a downhill grade, an undesired acceleration of the motor vehicle may occur. Because of a potentially irregular heating, temperature sensors, for example the temperature sensors of the winding, cannot record especially hot spots. This aspect of the invention is suitable for a preconditioning of the interior or for heating the interior in case of a traffic-related stoppage of the vehicle, for example at a traffic light.

The method can also include the step of actuation of the drive control device in such a way that only a field-generating current id is supplied to the electric machine. The field-generating current id does not contribute to the torque delivered by the electric machine. There is only low noise because no rotation occurs. Because of the direct current load during standstill, the limiting continuous withstand power of the electric machine and the drive control device decreases. Because of a potential irregular heating, the temperature sensors of the winding do not detect especially hot spots. This step is feasible for preconditioning the interior during standstill of the motor vehicle or during traffic-related stoppage of the motor vehicle.

The method can include the step of actuation of the electric drive in such a way that the drive control device actuates the electric machine such that a rotating field is created in the electric machine without the axis of the electric machine rotating. The frequency of the rotating field can be so high that it cannot effect a rotation of the axis of the electric machine because the generated torque is too low. This step can result in strong high-frequency alternating torques. Possibly, vibrations and/or noises may be expected because of the alternating torques. The system is outside of the regular current control. The waste heat and/or the losses are therefore difficult to estimate. Loss maximization due to a symmetrical load and frequency-related iron losses is possible. Furthermore, it is necessary to switch the heating operating mode to normal control during driving of the motor vehicle. This step is suitable for preconditioning the interior of the motor vehicle and in case of a traffic-related stop of the motor vehicle.

According to another aspect of the invention, if the electric machine and/or the motor vehicle is at a standstill, the electric drive can be actuated such that the drive control device actuates the electric machine in such a way that the electric machine generates a first torque in a first direction and then a second torque in a second direction that is opposite to the first direction. The motor vehicle is not moved from the place where it is located by the first torque and the second torque. So as to avoid a rotating movement of the motor vehicle's power wheel, the control must quickly reverse the torque direction. Oscillations may occur due to dynamic torque changes. Because the torques are built up and relieved dynamically, a constant working point and/or loss value cannot be set. Depending on the dynamics of the control, a movement of the motor vehicle is possible. This aspect of the method can be applied for preconditioning the interior during parking of the motor vehicle or during traffic-related stopping. Furthermore, this operating mode can be used with an initial electric trip, e.g. after prolonged parking of the vehicle.

Under a further aspect, the invention includes the actuation of the electric drive, if the vehicle is moving such that the drive control device actuates the electric machine such that the electric machine generates a first superimposed torque in the first direction and then a second superimposed torque in the second direction, which is opposite to the first direction. The first superimposed torque and the second superimposed torque are superimposed on a torque of the electric machine. The motor vehicle is not accelerated and not decelerated by the first superimposed torque and the second superimposed torque. High-frequency alternating torques are superimposed on the driving torque and/or a coasting to generate additional losses. In doing so, there is the risk of creating a mechanical oscillation in the drive train. The alternating torques are critical with respect to control engineering.

Under a further aspect of the invention, if a transmission of the motor vehicle is in idle so that no torque is transmitted from the electric machine to a power wheel, the electric drive can be actuated such that the drive control device actuates the electric machine in such a way that the electric machine generates a torque. The electric machine can rotate the drive axis at a low speed. Oscillations and noises may occur due to the rotation. Losses can be set up to the maximum current for each speed. A bearing lubrication must be ensured, even in the case of parking. After the preconditioning, the axis of the electric machine must be brought to a standstill. This aspect of the invention is applicable for preconditioning the interior as well as for heating because of a traffic-related stop.

According to a further aspect of the invention, if the electric machine generates a torque for driving the vehicle, the electric drive can be actuated such that the drive control device delivers a higher field-generating current id to the electric machine than is required for the respective operating point of the electrical machine. Especially when starting, it is possible to heat for a short period of time with the maximum possible waste heating. The additional field-generating current id is superimposed on the regular control.

According to another aspect of the invention, if the electric machine generates current, the electric drive can be actuated such that a higher field-generating current id flows from the electric machine to the drive control device.

The invention also relates to a computer program product, which, if it is loaded into a memory of a computer having a processor, executes the steps of the method described above.

The invention also relates to a waste heat control system for a motor vehicle having an electric drive, which comprises a rechargeable battery and an electric machine that is supplied with current by the rechargeable battery and drives the motor vehicle. The waste heat control system is designed to determine the thermal load of at least two components of the electric drive. If one electric component of the electric drive has a lower thermal load than a second electric component, the electric drive is actuated such that the generation of waste heat increases in the first electric component of the electric drive and the generation of waste heat in the second electric component of the electric drive does not increase, and preferably decreases. If the first electric component of the electric drive has a higher thermal load than the second electric component, the electric drive is actuated such that the generation of waste heat in the second electric component of the electric drive increases and the generation of waste heat in the first electric component of the electric drive does not increase, and preferably decreases. The waste heat control system can be modified in such a way as described earlier with respect to the method.

The invention also relates to a motor vehicle with the waste heat control system described earlier.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows an exemplary principal circuit diagram of an electric drive.

DETAILED DESCRIPTION OF THE DRAWING

The present invention can be used with vehicles having only an electric drive or a so-called hybrid drive with a combustion motor and an electric machine for driving the motor vehicle.

FIG. 1 shows a principal circuit diagram of a vehicle with an electric drive, which uses the teachings of the present invention. The vehicle includes an electric machine 2 which can deliver a drive torque as well as generate a braking torque in a generator operation. The electric machine 2 is connected to an optional transmission 4, which drives a power wheel 8, which is in contact with a roadway. The transmission 4 can have at least one travel gear where the electric machine 2 is coupled with the power wheel 8, and have an idle gear where the electric machine 2 is not coupled with the power wheel 8. The electric drive also includes a drive control device 10, which has a power device 12, an impulse width modulation device 14, a current control device 16, a torque control device 18, a switching frequency selection device 20, a table for an optimum field current 22, a table for a trimmed field current 24, and a waste heat control device 26.

In the following, the mode of operation of the drive control device 10 is explained, in as far as it is not known already to one skilled in the art. A drive pedal and/or a speed control device (not shown) specify a target torque M to the torque control device 18. The torque control device generates a target value for a field-generating current id and a target value for a torque-generating current iq, which are delivered to the current control means. From the target value for the field-generating current id and the target value for the torque-generating current iq, the current control device determines a target value for a field-generating voltage ud and a target value for a torque-generating voltage uq, which are delivered to the impulse width modulation device 14. The impulse width modulation device 14 generates control signals for power transistors T1, T2, T3, T4, T5, T6 of a power device 12. The setup and the mode of operation of the power device 12 are known to one skilled in the art and need not be explained in greater detail. The outputs of the power transistors T1-T6 are connected to three windings of the electric machine 2. If the electric machine 2 generates a torque for driving the motor vehicle, a current flows from the power device 12 to the electric machine. If the electric machine 2 generates a braking torque, a current flows from the electric machine 2 to the power device 12.

The drive control device 10 furthermore comprises a table 22 for an optimum current angle β consisting of field-generating current and torque-generating current. If the electric drive 1 is not supposed to generate any additional waste heat, the torque control device 18 reads from the table 22 the optimum current angle for the respective operating point for an optimum field current. Furthermore, the switching frequency device 20 of the impulse width modulation device 14 specifies the optimum switching frequency of the power transistors T1 to T6. At a low speed of the electric machine 2, the switching frequency device 20 specifies a low switching frequency to generate the sampling points of the sinusoidal current signals for supplying the electric machine. The low switching frequency can be approx. 5 kHz, for example. If the electric machine 2 rotates at a higher speed, the switching frequency device 20 specifies a higher switching frequency for the power transistors T1 to T6, which generates more sampling points for the essentially sinusoidal current that is supplied to the electric machine 2.

In the following, the mode of operation of the drive control device 10 is explained in the case that additional waste heat is requested to control the temperature of the interior of the motor vehicle. If the waste heat control device 26 receives the signal T, which requests an additional waste heat, the waste heat control device 26 checks by means of a first sensor 32 the thermal load of the power device 12 and by means of a second sensor 30 the thermal load of the electric machine 2. The thermal load can be a temperature, a distance to the maximum temperature, the integral of the temperature over time, a combination of said quantity, or the like. The waste heat control device 26 actuates the electric drive 1 by means of the switching frequency device 20 such that more waste heat is generated in the respective component that has a lower thermal load, for example the electric machine 2 or power means 12.

At a high thermal load of the power device 12, the thermal load of the power device 12, in particular of the power transistors T1 to T6 and/or the diodes D1 to D6, can be reduced by reducing the switching frequency. This has a positive influence on the overall system performance. The load in the electric machine 2 would increase because of higher current impulses (current ripples). This would delay or prevent a degradation of the electric drive. This actuation represents an intentional deviation from the system-optimum operating point, which focuses on the overall efficiency, in order to positively influence the system behavior so that the waste heat was generated in the respective component 2, 12 that is subjected to a lower thermal load.

If the waste heat control device 26 determines that the electric machine 2 has a higher thermal load than the power device 12, the waste heat control device 26 could increase the switching frequency of the power transistors T1 to T6, which would generate more waste heat in the power device 12.

Alternately or in addition to this, the waste heat control device 26 can effect that the current angle β of field-generating current id and torque-generating current iq is changed. For example, additional field-generating current id can be generated. If additional waste heat is to be generated, a switching device 27 is switched such that the torque control device 18 reads the target value for an optimum current angle β for the respective operating point from the table 24 for a trimmed field-generating current id. In general, it applies that the waste heat generated by an electric drive 1 is proportional to the square of the current. The higher field-generating current id increases the dissipation power of the electric drive 1, and it does so in proportion to the square of the increase of the field-generating current id.

As described earlier, the waste heat control device 26 can increase the switching frequency of at least one of the transistors T1 to T6 of the power device 12 if more waste heat is to be generated in the power device 12 and less waste heat is to be generated in the electric machine 2. The waste heat control device 26 can reduce the switching frequency of at least one of the transistors T1 to T6 of the power device 12 if less waste heat is to be generated in the power device 12 and more waste heat is to be generated in the electric machine 2.

The waste heat control device 26 can monitor the temperature of the drive control device 12 by means of the sensor 32 and actuate the electric drive 1 such that fluctuations of the temperature of the components T1 to T6, D1 to D6 of the power device 12 are lower than a predetermined threshold value.

The waste heat control device 26 can operate a brake 28 of the motor vehicle and actuate the electric machine 2 by means of the power device 12 such that it is to move the motor vehicle. This creates additional waste heat.

The waste heat control device 26 can actuate the power device 12 such that only a field-generating current id is fed to the electric machine, which generates additional waste heat.

The waste heat control device 26 can actuate the electric machine 2 by means of the power device 12 such that an electric rotating field is generated without the axis of the electric machine 2 rotating, which creates additional waste heat. This can be achieved, for example, by an electric field with a relatively high angle frequency.

If the motor vehicle is at a standstill, the waste heat control device 26 actuates the electric machine by means of the power device 12 such that the electric machine generates a first torque in a first direction and thereafter generates a second torque in a second direction, which is opposite to the first direction. The motor vehicle is not moved away from its current location by the first torque and the second torque. This can also generate additional waste heat.

If the motor vehicle moves, the waste heat control device 26 can actuate the electric machine by means of the power device 12 such that the electric machine generates a first superimposed torque in the first direction and thereafter generates a second superimposed torque in the second direction, which is opposite to the first direction. The first superimposed torque and the second superimposed torque are superimposed on a rotating movement of the electric machine 2. The motor vehicle is not accelerated and not decelerated by the first superimposed torque and the second superimposed torque. The superimposed torque can be a torque that is superimposed if the electric machine 2 drives the motor vehicle. This also generates additional waste heat. If the transmission 4 of the motor vehicle is idling and the electric machine 2 does not apply a torque to a power wheel 8, the waste heat control device 26 can actuate the electric drive 2 by means of the power device 12 such that the electric machine 2 generates a torque. This also generates additional waste heat.

If the electric machine generates a torque for driving the motor vehicle, the waste heat control device 26 can actuate the electric machine 2 by means of the power device 12 such that a higher field-generating current id is supplied to the electric machine 2 than is required for the respective operating point. This also generates additional waste heat.

If the electric machine 2 generates current, the waste heat control device 26 can effect by means of the power device 12 that a higher field-generating current id flows from the electric machine to the power means 12. In this way, more waste heat can be generated during recuperation operation and/or generator operation. By way of such trimming, mechanical energy, which is to say braking energy, can be taken up without guiding energy into the storage. This can lead to a reduction of the thermal load and/or the wear and tear of the mechanical brake (disk brake, drum brake).

The waste heat control device 26 or another control means of the motor vehicle can actuate the electric drive 1 such that if the state of charge of the rechargeable battery prevents any charge uptake or current uptake, the optimum operating point of the electric machine 2, the drive control device 10 and/or the power device 12 is deviated from so that a further delay is possible without mechanical wear and tear and the waste heat created in this way in the electric drive 1 can be used for controlling the temperature of the interior.

A cooling fluid can be heated most effectively by losses in the stator. In this way, the lowest heat transition losses are created by the waste heat generated in the stator sheet because of the iron losses. Furthermore, the waste heat can be efficiently discharged in the stator winding. The waste heat in the rotor can be discharged only to a limited extent and/or slowly by the stator cooling because of the insulating air gap. A cooling of the electric machine 2 can occur by a fluid line 34, which runs through and/or at the sheet packets and/or through and/or at the windings of the electric machine 2. One skilled in the art knows this type of fluid cooling and it is therefore not described here in any greater detail.

In case of a converter topology with an impulse width modulation and in case of a field-oriented control there is a current control, so that the phase current is the waste source that can be controlled best and most efficiently. However, with each change of current, a stable operating point has to be found. Below the characteristic curve with the maximum efficiency, depending on the selection of the current phases between the torque-generating current iq and the field-generating current id, an operating point can be selected between a minimal strand current i for an optimum efficiency or a maximum strand current for a maximum waste heat generation, depending on actual speed and/or actual torque. Because of the non-linear context of the machine parameters, the operating points have to be determined by way of simulation and can be stored for the control device 18 in a table 24 with trimmed current angles β.

The waste heat that can be generated depends on the values for a maximum current of the electric machine 2 and the power device 12. For a brief heat-up phase, a peak current operation with maximum losses is possible, which can be approx. 4 kW to approx. 5.5 kW. Because of the current control dynamics, a quick change from a trimmed operation for generating additional waste heat to a regular operation with an optimized degree of efficiency is possible quickly and without any problems. As long as the insulation and the permanent magnets are not heated beyond the admissible temperature and the temperature control works identically as in normal operation, no shortening of the service life of the components is to be expected. With each electric machine, it must be checked whether, in the case of an additional field-generating current id in the amount of the maximal strand current, a demagnetization of the permanent magnets may occur due to an opposing field that is too strong. If a demagnetization of the permanent magnets can occur because of the high field-generating current id, the field-generating current id has to be limited to an admissible threshold value. Furthermore, the dissipation power may depend on the degree of modulation. However, because of the voltage of the rechargeable battery and because of the current control, the degree of modulation is not a quantity that can be randomly set. The degree of modulation corresponds to the ratio of the actual alternating voltage to the ideal alternating voltage. The degree of modulation can be influenced with appropriate modulation methods. Regardless of this, a minimal voltage must be provided for the control of the machine so as to be able to reach the operating point.

A conventional control structure for a permanently excited synchronous machine comprises in regular operation with optimized efficiency a table 22, which specifies the field-generating current id as a function of the operating point. The same mechanism can be used by employing a previously calculated table 24 for the field-generating current id in the case of a trimming for heating with a high dissipation power. As in normal operation, the influences of the temperature and the direct current on the optimum field-generating current id either have to be followed up in the control model or compensated by a multi-dimensional table for the field-generating current id. The change between the normal operating mode and the operating mode for generating more dissipation power occurs with a simple request signal T. The dynamics in changing these operating modes is limited only by the motor time constants, which are typically in a range of a few 100 ms. Because of the superimposed torque control 18, no torque interruption should be noticeable in normal driving operation during the change of operating modes.

Because of the necessary filter control current, the asynchronous machine requires a bit more current overall under the same conditions, which can lead to higher ohmic losses in the stator winding. In the rotor winding or cage, there is also current-dependent partial dissipation power, which, without additional rotor cooling connections, can be only sluggishly discharged and utilized via the stator cooling. However, the rotor losses can be reduced with a deliberate rotary frequency change. With an asynchronous machine, the rotary frequency change is used to change the slippage. This leads to lesser losses in the rotor. Losses in the rotor and in the stator can be influenced by influencing the rotary frequency and/or slippage.

Even if an asynchronous machine works differently than a permanently excited machine, the currents can be divided into a field-generating current id and into a torque-generating current iq with an asynchronous machine as well. Therefore, the strand current can be increased almost randomly with a deliberate field trimming, for example a pure field-generating current id, without any effect on the torque. Each simulation is based on completely different equivalent circuit diagrams with deviating machine parameters. Therefore, with an asynchronous machine, the optimization for the normal operation and for the case of requesting an additional waste heat is clearly different than the asynchronous machine. With the asynchronous machine, the rotor demagnetization does not need to be taken in account with respect to generating additional waste heat.

The present invention has the advantage that heat can be generated for heating the interior of an electrically driven vehicle without requiring any additional components. In this way, the production effort and the mass of the electrically driven motor vehicle can be reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling waste heat generated by a motor vehicle with an electric drive, wherein the electric drive comprises a rechargeable battery, an electric machine to drive the motor vehicle, and a drive control device that controls actuation of the electric machine with current from the rechargeable battery and/or charging of the rechargeable battery with current generated by the electric machine, the method comprising the acts of:
   determining a thermal load of at least two components of the electric drive;
   if a first electric component of the electric drive has a lower thermal load than a second electric component, actuating the electric drive such that generation of waste heat in the first electric component of the electric drive increases and generation of waste heat in the second electric component of the electric drive does not increase; and
   if the second electric component of the electric drive has a lower thermal load than the first electric component, actuating the electric drive such that generation of waste heat in the second electric component of the electric drive increases and generation of waste heat in the first electric component of the electric drive does not increase;
   wherein the actuating of the electric drive includes:
      increasing a switching frequency of at least one of transistors of the drive control device if more waste heat is to be generated in the drive control device and less waste heat is to be generated in the electric machine; and
      decreasing the switching frequency of at least one of the transistors of the drive control device if less waste heat is to be generated in the drive control device and more waste heat is to be generated in the electric machine; and
   controlling the temperature of an interior of the motor vehicle with the waste heat generated by the components of the electric drive.

2. The method according to claim 1, further comprising the acts of:
   monitoring the temperature of the drive control device; and
   actuating the electric drive such that the fluctuation of the temperature of the components of the drive control device is lower than a predetermined threshold value.

3. The method according to claim 1, further comprising the act of:

supplying current by the drive control device such that a ratio of a field-generating current id and of a torque-generating current iq is outside of an optimum ratio of the field-generating current id and of the torque-generating current iq for a respective operating point.

4. The method according to claim 1, further comprising one or more of the acts of:
applying a brake of the motor vehicle and actuating the electric drive such that it is to move the motor vehicle;
actuating the drive control device such that only a field-generating current id is supplied to the electric machine;
actuating the electric drive such that the drive control device actuates the electric machine such that a rotary field is generated in the electric machine without the axis of the electric machine rotating;
if the motor vehicle is at a standstill, actuating the electric drive such that the drive control device actuates the electric machine such that the electric machine generates a first torque in a first direction and thereafter generates a second torque in a second direction that is opposite to the first direction, wherein the motor vehicle is not moved away from where it is located by the first torque and the second torque;
if the motor vehicle moves, actuating the electric drive such that the drive control device actuates the electric machine such that the electric machine generates a first superimposed torque in the first direction and thereafter generates a second superimposed torque in the second direction, which is opposite to the first direction, wherein the first superimposed torque and the second superimposed torque are superimposed on a rotary movement of the electric machine and the motor vehicle is not accelerated and not decelerated by the first superimposed torque and the second superimposed torque;
if a transmission of the motor vehicle is idling so that no torque is transmitted from the electric machine to a power wheel, actuating the electric drive such that the drive control device actuates the electric machine such that the electric machine generates a torque;
if the electric machine generates a torque for driving the motor vehicle, actuating the electric drive such that the drive control device supplies the electric machine with a higher field-generating current id than is required for the respective operating point; and
if the electric machine generates current, actuating the electric drive such that a higher field-generating current id flows from the electric machine to the drive control device.

5. A computer product, comprising a non-transitory computer readable medium having stored therein program code that, when executed by a processor, causes the processor to:
determine a thermal load of at least two components of an electric drive;
if a first electric component of the electric drive has a lower thermal load than a second electric component, actuate the electric drive such that generation of waste heat in the first electric component of the electric drive increases and generation of waste heat in the second electric component of the electric drive does not increase;
if the second electric component of the electric drive has a lower thermal load than the first electric component, actuate the electric drive such that generation of waste heat in the second electric component of the electric drive increases and generation of waste heat in the first electric component of the electric drive does not increase;
increase a switching frequency of at least one of transistors of a drive control device of the electric drive if more waste heat is to be generated in the drive control device and less waste heat is to be generated in an electric machine of the electric drive;
decrease the switching frequency of at least one of the transistors of the drive control device if less waste heat is to be generated in the drive control device and more waste heat is to be generated in the electric machine; and
control the temperature of an interior of a motor vehicle with the waste heat generated by the components of the electric drive.

6. A waste heat control system for a motor vehicle equipped with an electric drive comprising a rechargeable battery, an electric machine suppliable with current by the rechargeable battery, the electric machine driving the motor vehicle, and a drive control device that controls actuation of the electric machine with current from the rechargeable battery and/or charging of the rechargeable battery with current generated by the electric machine, wherein the waste heat control system includes a processor and associated non-transitory memory storing program code therein which, when executed, causes the processor to:
determine a thermal load of at least two components of the electric drive;
if a first electric component of the electric drive has a lower thermal load than a second electric component, actuate the electric drive such that generation of waste heat in the first electric component of the electric drive increases and generation of waste heat in the second electric component of the electric drive does not increase;
if the second electric component of the electric drive has a lower thermal load than the first electric component, actuate the electric drive such that generation of waste heat in the second electric component of the electric drive increases and generation of waste heat in the first electric component of the electric drive does not increase;
increase a switching frequency of at least one of transistors of the drive control device if more waste heat is to be generated in the drive control device and less waste heat is to be generated in the electric machine;
decrease the switching frequency of at least one of the transistors of the drive control device if less waste heat is to be generated in the drive control device and more waste heat is to be generated in the electric machine; and
control the temperature of an interior of the motor vehicle with the waste heat generated by the components of the electric drive.

7. A motor vehicle comprising the waste heat unit system according to claim 6.

* * * * *